Jan. 10, 1950
H. E. SIMI
2,494,411
TIRE CARRIER
Filed July 1, 1946
2 Sheets-Sheet 1
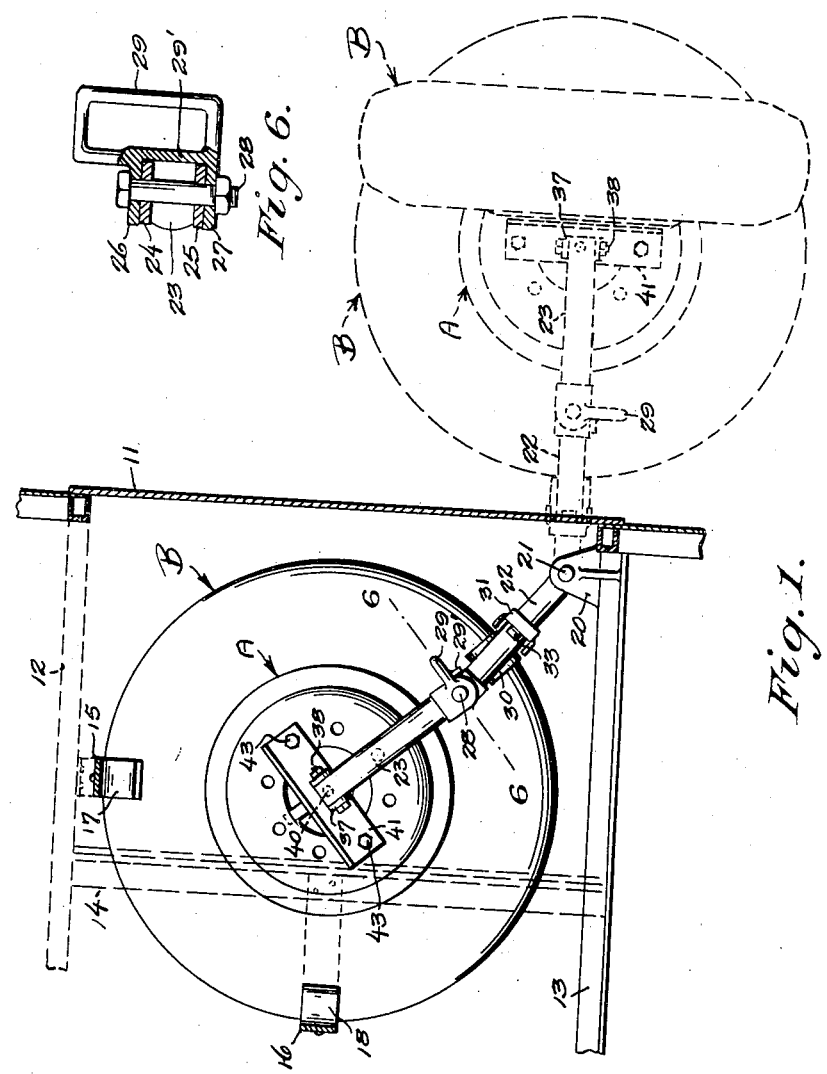
INVENTOR:
Hendrick E. Simi
BY
ATTORNEY.

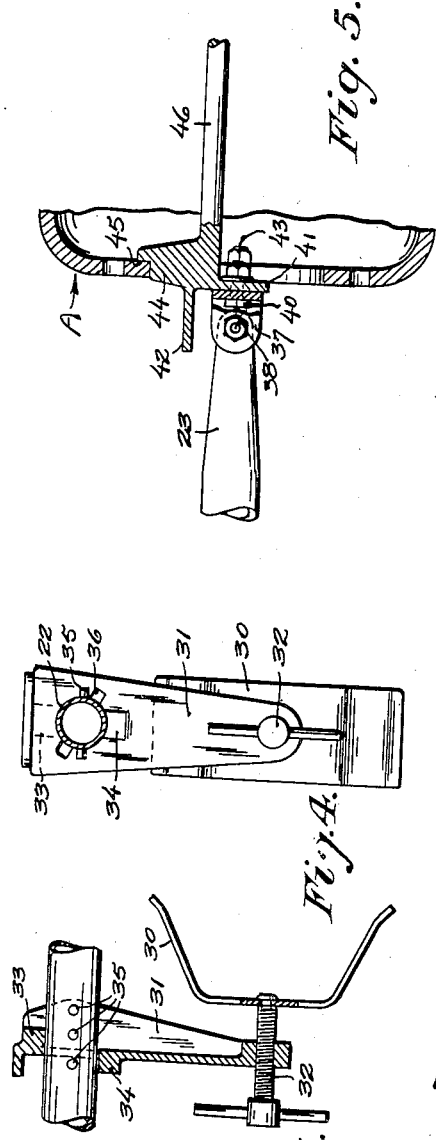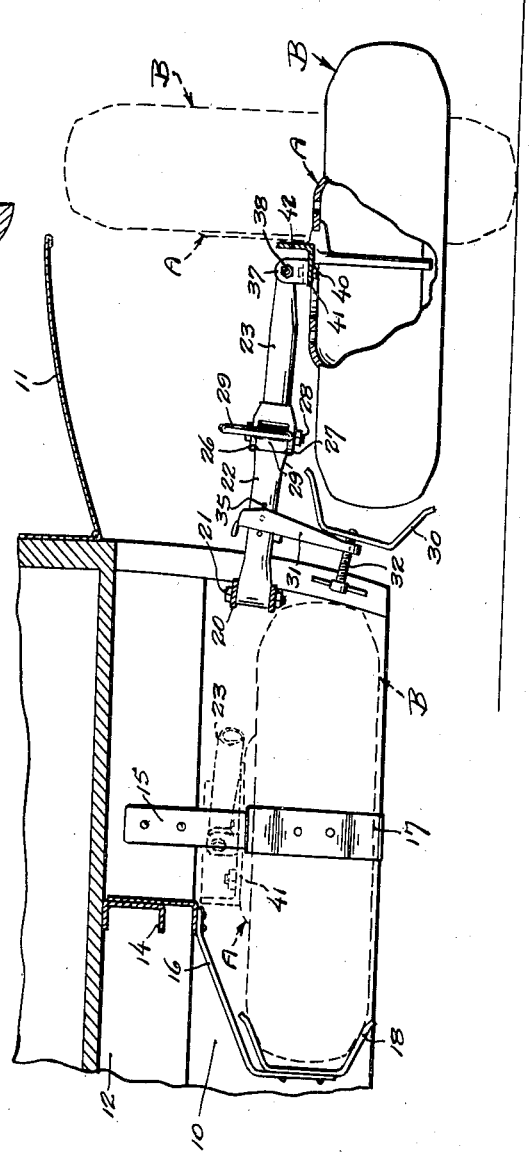

Patented Jan. 10, 1950

2,494,411

UNITED STATES PATENT OFFICE 2,494,411

TIRE CARRIER

Hendrick E. Simi, Seattle, Wash., assignor to Kenworth Motor Truck Corporation, Seattle, Wash., a corporation of Washington Application July 1, 1946, Serial No. 680,703

20 Claims. (Cl. 224—42.21)

This invention relates to tire carriers, and for its general object aims to perfect a tire carrier of a type adapting itself to use on a bus body.

More particularly, it is an important object of the present invention to provide a tire carrier incorporating an arm swingable in an approximately horizontal plane into and from a receiving compartment, and wherein the said arm embodies a toggle construction whereby, through its permitted folding, it becomes possible to move the tire in more or less of a straight line into and out of the compartment, the toggle-joint construction serving the added and important ends of (1) developing endwise pressure of considerable magnitude by the exertion of comparatively little effort on the part of the operator and by said pressure firmly seating the tire against supporting shoes therefor provided within the compartment, and (2) providing a simple and convenient means of locking the tire in its said seated position.

It is a further and important object to devise a tire carrier of particularly light construction, and which is made possible largely in consequence of providing an arrangement in which the swingable arm is entirely relieved of the weight of the tire during operation of the bus, and which is to say when the tire is supported within the compartment.

As a further object still, the invention aims to provide a tire carrier in which the free end of the swinging arm is provided with a cross arm to engage the tire-carrying wheel, and wherein this cross arm is rotatively associated with the swinging arm to enable the cross arm and the tire to be most easily correlated when mounting the tire upon the carrier.

Having other and important objects and advantages in view, and which, with the foregoing, will appear and be understood in the course of the following description and claims, the invention consists in the novel construction, adaptation and combination of parts hereinafter described and claimed.

In the accompanying drawings:

Figure 1 is a fragmentary horizontal sectional view through a bus body looking into a spare-tire compartment which is provided thereby and illustrating, in top plan, a tire carrier constructed in accordance with the now preferred embodiment of the present invention, full lines being employed in this view to show the carrier in its supported position, and dotted lines being used to illustrate the exposed position.

Fig. 2 is a transverse vertical section on line 2—2 of Fig. 1, modified therefrom in that the door to the compartment is shown in open position and with the position of the carrier and its supporting tire being here reversed, and which is to say that the carrier is shown by full lines in its exposed position and by dotted lines in its housed position.

Fig. 3 is a fragmentary vertical sectional view taken to a scale enlarged from that of the preceding views and detailing one of three shoes which act in conjunction to hold the tire securely within the compartment, the shoe here shown being a movable shoe carried by and made adjustable in relation to the swinging arm.

Fig. 4 is an end elevation of said adjustable shoe with the swinging arm shown in section.

Fig. 5 is a fragmentary sectional view detailing the tire-engaging yoke bar of the carrier structure with a spare tire mounted thereon; and Fig. 6 is a detailed vertical sectional view on line 6—6 of Fig. 1.

According to the present invention, there is provided under the floor of the bus, and desirably occupying a position along the right-hand side of the body, a spare-tire compartment 10, and this compartment is open at the bottom and is made accessible from the side by means of a door 11 which, by preference, is hinged at the top. Running transverse to the bus, beam-sections 12 and 13 are provided along the sides of the compartment or at the front and back ends when considered in relation to the bus, and there is provided adjacent the back of the compartment a stringer 14 running between these beam-sections. The spacing between the beam-sections need be little more than the diameter of the tire, and suspended by drop-arm 15 from the member 12 and by a drop-arm 16 from the stringer 14 are respective stationary shoes 17 and 18. These two shoes occupy a common horizontal plane and are spaced 90° or thereabouts on the imaginary arc of a circle corresponding to the tire's perimeter taken about the vertical center of the compartment.

20 denotes a bracket suspended from the other of the two beam-sections 13 at the forward end of the compartment, and pivoted as at 21 to this bracket for swinging movement in an approximate horizontal plane is a toggle-jointed arm which is given an overall length somewhat greater than the radius of the tire which is to be carried. It is here pointed out that the pivot pin 21 is offset from a true vertical axis and such, more especially, as to lean slightly toward the frontal opening. The toggle links of such arm, designated 22 and 23, are preferably of tubular construction and the center or knee joint therefor is comprised of interfitting pairs of ears, as 24—25 and 26—27, hinged by a vertical pin 28 and having a handle-forming loop 29 extending laterally from one set of said ears. Provided at the inside of this handle is a vertical leg 29' which acts by its abutment against the other link of the toggle to limit the past-center travel of the pin 28 into the locking position in which the toggle-arm is illustrated in Fig. 1.

There is provided a third and adjustable shoe 30 adapted to act in conjunction with the stationary shoes 17 and 18, and this third shoe is suspended from the inner link of the toggle arm by means of a hanger 31, the adjustment comprising a screw-rod 32 having threading engagement with the hanger and swivel-connected to the shoe. The hanger itself is given a loose sliding fit upon the frame-mounted toggle link 22 and is so associated with this link as to develop a bind in relation thereto by the act of cocking the hanger, and this cocking, in a manner which will become apparent in the course of describing the operation of the device, occurs in consequence of tightening the screw to force the shoe 30 against a tire. The binding action is augmented by providing lugs 33 and 34 upon the opposite faces of the hanger, one lug being placed to lie below and the other lug to lie above the tubular member 22. Positive assurance against the shoe sliding on the toggle link after having been tightened against a tire is provided by a series of pins 35 which project from diametrically opposite sides of the toggle link at closely spaced intervals of the latter's length. Passage by these projections where it becomes necessary so to do in applying the carrier to a spare tire is accomplished by imparting slight rotation to the hanger and such, more especially, as to bring the projecting pins into register with mating slots 36.

Upon the free end of the toggle arm is a knuckle joint comprised of a chair 37 hinged to the link 23 by a transverse pin 38, and secured in turn by a swivel-pin 40 to this chair is a yoke-bar 41. This yoke-bar, which is reinforced by a web 42, has a length somewhat greater than the inside diameter of the spare wheel which is to be carried, and boltholes are provided in the opposite ends of this yoke-bar to register one with one and the other with the other of a selected pair of diametrically opposite bolt-holes formed in the wheel, the registering holes of the yoke-bar and the wheel being arranged to receive bolt-and-nut assemblies 43 for securing the wheel upon the yoke-bar. For centering the wheel in relation to said bar 41, the latter is provided at a point central to its length with a laterally projected finger 44 notched as at 45 in a manner such as to hook under the wheel (see Figs. 2 and 5), serving when so hooked to place the bar 41 in a position whereat the same extends substantially diametrically across the wheel's center. Denoted 46 is a lever made rigid with the yoke-bar. This lever extends into the center opening of the supported tire on an axis more or less coinciding with the axis of the wheel, and the length of this lever is sufficient to enable an operator to readily grasp and operate the same for swinging the chair 37 and its swivel-attached yoke-bar 41, resisted by the weight of a wheel carried by the latter, about the transverse pivot 37.

The operation is as follows:

To place a wheel, denoted by the letter A, upon the carrier, the toggle arm is swung outwardly into the full-line position in which it is shown in Fig. 2. The wheel, standing upright as indicated by dotted lines in said Fig. 2, is caused to be hooked by the finger 44 and bolts are then readily inserted to secure the wheel upon the yoke-bar. Grasping the lever 46, the operator now presses downwardly and inwardly to move the wheel-mounted tire B into the position in which it is shown by full lines, whereupon the adjustable shoe 30 is brought up against the tire and the screw tightened. The operator now manually swings the wheel into the compartment, jackknifing the toggle arm such as to clear the side edges of the compartment and again straightening the toggle arm as the tire moves into the compartment. Upon being so straightened or, more properly stated, moved into and slightly beyond an in-line relation, the leading wall of the tire is first brought up against the stationary shoe 17 and then, using this shoe more or less as a fulcrum, is forced yet further into the compartment to engage the shoe 18. In consequence of the minor travel which the tire takes after having engaged the shoe 17, it becomes necessary, in order that scuffing be precluded, that the tire be allowed to turn somewhat in relation to the toggle arm. The pivot 40 permits this relative rotation. In removing the tire from the compartment, the reverse of the above operation is performed. It will be particularly noted that the plane through which the toggle arm travels in its movement from the compartment is slightly declined. This is of considerable import in that the operator, by shifting the position of the exposed toggle arm's free end fore-and-aft in relation to the bus, causes the free end to rise or fall and thus adapts the carrier to ground irregularities. Bus tires are, perforce, quite heavy, and the described feature precludes a bus operator from having to manhandle a tire which is being changed in order to bring the center of the upstanding tire into the plane occupied by the swinging arm of the carrier.

From the above detailed description of the invention, it is believed that the construction and use thereof will at once be apparent. No limitations are to be implied therefrom, it being my intention that all forms of construction and variations in detail coming within the scope of the hereto annexed claims are to be considered as comprehended by the invention.

What I claim is:

1. A carrier for a wheel-mounted spare tire and which comprises, in combination with a receiving compartment: a horizontal toggle-jointed arm pivotally supported by one end for movement about an approximately vertical axis and swingable by its free end into and out of the compartment with the arrangement being such as to bring the articulating limbs of the arm into substantially an in-line relation in both of said positions; and means on said free end of the arm for engaging the wheel and serving to position the wheel and its tire horizontally.

2. A carrier for a wheel-mounted spare tire and which comprises, in combination with a receiving compartment: a horizontal toggle-jointed arm pivotally supported by one end for movement about an approximately vertical axis and swingable by its free end into and out of the compartment with the arrangement being such as to bring the articulating limbs of the arm into substantially an in-line relation in both of said positions, said free end having a knuckle joint thereon with the knuckle axis being horizontal and transverse to the arm; and a yoke-bar carried by the free-swinging element of the knuckle joint and arranged to span the center opening of the wheel with means provided thereon for securing the same to the wheel.

3. A carrier for a wheel-mounted spare tire and which comprises, in combination with a receiving compartment: a horizontal arm pivotally supported for swinging movement of its free end into and out of the compartment and about an axis generally vertical but leaning slightly from the perpendicular toward the front of the compartment; a knuckle joint on the free end of the arm having its knuckle axis disposed horizontally and transverse to the arm; and means arranged and adapted to engage the wheel and having swivel connection with the free end of the knuckle joint.

4. A carrier for a wheel-mounted spare tire and which comprises, in combination with a receiving compartment: a horizontal knuckle-jointed arm pivotally supported by one end for swinging movement of its free end into and out of the compartment and about an axis generally vertical but leaning slightly from the perpendicular toward the front or outside of the compartment; a knuckle joint on the free end of the arm having its knuckle axis disposed horizontally and transverse to the arm; and means arranged and adapted to engage the wheel and having swivel connection with the free end of the knuckle joint.

5. A carrier for a wheel-mounted spare tire and which comprises, in combination with a receiving compartment: a horizontal arm pivotally supported for swinging movement of its free end about an approximately vertical axis into and out of the compartment; means on the free end of the arm for engaging the wheel and serving to position the wheel and its tire horizontally; a stationary load-sustaining shoe located in the back of the compartment and, by the act of swinging the wheel-carrying arm into the compartment, caused to be brought into saddling engagement to the back part of the tire; a hanger member supported by the arm and shiftable into longitudinally adjusted positions thereon; and a load-sustaining shoe carried by the hanger member, the shoe last mentioned being itself adjustable relative to the hanger member to enable the same to be brought firmly into tensioned saddling engagement over the front part of the tire at a point approximately diametrically opposite the stationary shoe.

6. A carrier for a wheel-mounted spare tire and which comprises, in combination with a receiving compartment: a horizontal arm pivotally supported for swinging movement of its free end about a generally vertical axis into and out of the compartment; a knuckle joint on the free end of the arm having its knuckle axis disposed horizontally and transverse to the arm; and means arranged and adapted to engage the wheel and having swivel connection with the free end of the knuckle joint.

7. A carrier for a wheel-mounted spare tire and which comprises, in combination with a receiving compartment: a horizontal toggle-jointed arm pivotally supported by one end for movement about an approximately vertical axis and swingable by its free end into and out of the compartment; a knuckle joint on the free end of the arm having its knuckle axis disposed horizontally and transverse to the arm; and means arranged and adapted to engage the wheel and having swivel connection with the free-swinging element of the knuckle joint.

8. A carrier for a wheel of the character described, and which is to say one providing an annular center opening, and having bolt-holes placed at equidistantly spaced intervals around the opening, said carrier comprising, in combination with a receiving compartment: a horizontal arm pivotally supported for movement about a generally vertical axis and swingable by its free end into and out of the compartment; a knuckle joint on the free end of the arm having its knuckle axis disposed horizontally and transverse to the arm; and a yoke-bar carried by the free-swinging element of the knuckle joint, having its ends apertured to register with a selected pair of diametrically opposite apertures in said wheel, and providing an integral finger extending substantially at right angles to a line projected through the two end apertures and arranged to lodge against the rim of the wheel's center opening for correlating the end apertures of the yoke-bar to the paired apertures of the wheel.

9. A carrier according to claim 8 in which the yoke-bar is swivel-connected to the free-swinging element of the knuckle joint.

10. A carrier according to claim 8 having a manipulating lever produced as an integral part of the yoke-bar and arranged, when the wheel is engaged by the yoke-bar, to project through the center opening of the wheel and occupy a position axial or nearly axial thereto.

11. A carrier for a wheel-mounted spare tire and which comprises, in combination with a receiving compartment: a horizontal arm pivotally supported for swinging movement of its free end about a generally vertical axis into and out of the compartment; a knuckle joint on the free end of the arm the knuckle axis of which is disposed horizontally and transverse to the arm; means carried by the free-swinging element of the knuckle joint arranged to engage the wheel, said means being movable about the knuckle axis of the knuckle joint from a position whereat the tire occupies a vertical plane into a position locating the tire horizontally; a pair of spaced-apart and stationary load-sustaining shoes located in the back of the compartment and, by the act of swinging the arm to move the horizontally positioned tire into the compartment, caused to be brought into saddling engagement to the back part of the tire; and a load-sustaining shoe carried for longitudinal adjustment by the arm and arranged to be brought into firm saddling engagement to the front part of the tire at a point approximately diametrically opposite the stationary shoes.

12. A carrier for a wheel-mounted spare tire and which comprises, in combination with a receiving compartment: a horizontal toggle-jointed arm pivotally supported by one end for movement about a generally vertical axis and swingable by its free end into and out of the compartment; a knuckle joint on the free end of the toggle-jointed arm the knuckle axis of which is disposed horizontally and transverse to the arm; means carried by the free-swinging element of the knuckle joint arranged to engage the wheel, said means being movable about the knuckle axis of the knuckle joint from a position whereat the tire occupies a vertical plane into a position locating the tire horizontally; a pair of spaced-apart and stationary load-sustaining shoes located in the back of the compartment and, by the act of swinging the arm to move the horizontally positioned tire into the compartment, caused to be brought into saddling engagement to the back of the tire; and a load-sustaining shoe carried for longitudinal adjustment by the arm and arranged to be brought into firm saddling engagement to the front part of the tire at point approximately diametrically opposite the stationary shoes.

13. The structure of claim 12 having an operating handle for the toggle-jointed arm extending laterally from the knee of the arm as an integral part of one link of the latter.

14. Structure according to claim 12 in which said generally vertical axis of the toggle-jointed arm is inclined from the perpendicular to lean slightly toward the front of the compartment and in consequence cause the knuckle-jointed end of the arm to trace a gradually rising path of travel in the course of its movement into the compartment.

15. A carrier for a wheel-mounted spare tire and which comprises, in combination with a receiving compartment: a horizontal toggle-jointed arm pivotally supported by one end for movement about a generally vertical axis and swingable by its free end into and out of the compartment; a knuckle joint on the free end of the toggle-jointed arm the knuckle axis of which is disposed horizontally and transverse to the arm; means carried by the free-swinging element of the knuckle joint arranged to engage the wheel and movable about the knuckle axis from a position whereat the tire occupies a vertical plane into a position locating the tire horizontally; a pair of spaced apart and stationary tire-saddling shoes locating in the back of the compartment and, by the act of swinging the arm into the compartment and straightening the links into a generally in-line relation, the shoes are cause to bear against the back part of the tire; a hanger carried by the inner link of the toggle arm; a screw-rod working in said hanger; and a tire-saddling shoe swivel-connected to the screw-rod and by the operation of the latter brought into firm engagement with the tire at a point approximately diametrically opposite the stationary shoes.

16. The structure of claim 15 in which the hanger is given a loose sliding fit upon the related toggle link and relies upon a binding action for securing the same in longitudinally adjusted position thereon.

17. The structure of claim 15 in which the hanger is given a loose sliding fit upon the related toggle link and relies upon a binding action for securing the same in longitudinally adjusted position thereon, said hanger being movable by hand into any one of a number of longitudinally spaced positions upon the toggle link, and positive stop means holding the hanger against slippage out of said hand-set positions.

18. A spare-tire carrier comprising a toggle-jointed arm arranged to carry the tire upon one end thereof, having the other end pivoted to enable the arm to swing about an approximately vertical axis, and movable through an angular path and with an intervening jack-knifing of the arm between outer and inner extremes of travel both of which position the two limbs of the arm in a generally in-line relation, one of the two limbs of the arm having a handle rigid therewith and disposed to occupy a position in the approximate transverse plane of the toggle joint.

19. The structure of claim 18 in which the toggle joint of the arm swings at the inner extreme of the arm's movement through and beyond an in-line relation of the limbs, and wherein stop means are provided permitting the toggle joint to move only a minor degree beyond said in-line relationship.

20. A spare-tire carrier for a wheeled vehicle, the vehicle providing a compartment for receiving the spare tire, and comprising, in combination with the vehicle and its said compartment: a horizontal arm pivotally supported for swinging movement of its free end into and out of the compartment and about an axis generally vertical but leaning slightly from the perpendicular toward the front of the compartment; and means on the free end of the arm for engaging the wheel, said means including a knuckle joint with the knuckle axis disposed horizontally and transverse to the arm, the leaning pivot for said arm being so located in elevated relation above the ground surface on which the running wheels of the vehicle track as to cause the tread surface of said spare tire to be responsively brought into contact with said ground surface by the act of moving the arm to the outer extreme of its swinging movement and coincidently swinging the spare tire into a vertical position about its said knuckle axis, thus to afford a ground support sustaining the weight of the spare tire when the latter is removed from or applied to the free end of the arm.

HENDRICK E. SIMI.

REFERENCES CITED

The following references are of record in the file of this patent:

UNITED STATES PATENTS

| Number | Name | Date |
|---|---|---|
| 1,506,833 | Higginbotham | Sept. 2, 1924 |
| 1,864,829 | Kennedy et al. | June 28, 1932 |
| 1,925,123 | Vincent | Sept. 5, 1933 |
| 2,063,598 | Franklin | Dec. 8, 1936 |
| 2,091,071 | Girl | Aug. 24, 1937 |
| 2,210,085 | Langdon | Aug. 6, 1940 |
| 2,325,848 | Gildea et al. | Aug. 3, 1943 |
| 2,378,911 | Clark | June 26, 1943 |

FOREIGN PATENTS

| Number | Country | Date |
|---|---|---|
| 749,561 | France | May 8, 1933 |